Sept. 23, 1941.   J. J. JAKOSKY   2,256,742
ELECTRICAL EXPLORATION OF THE SUBSURFACE
Filed June 13, 1939   2 Sheets—Sheet 1

Inventor
JOHN JAY JAKOSKY,
By Arthur R. Knight and
Alfred W. Knight
Attorneys

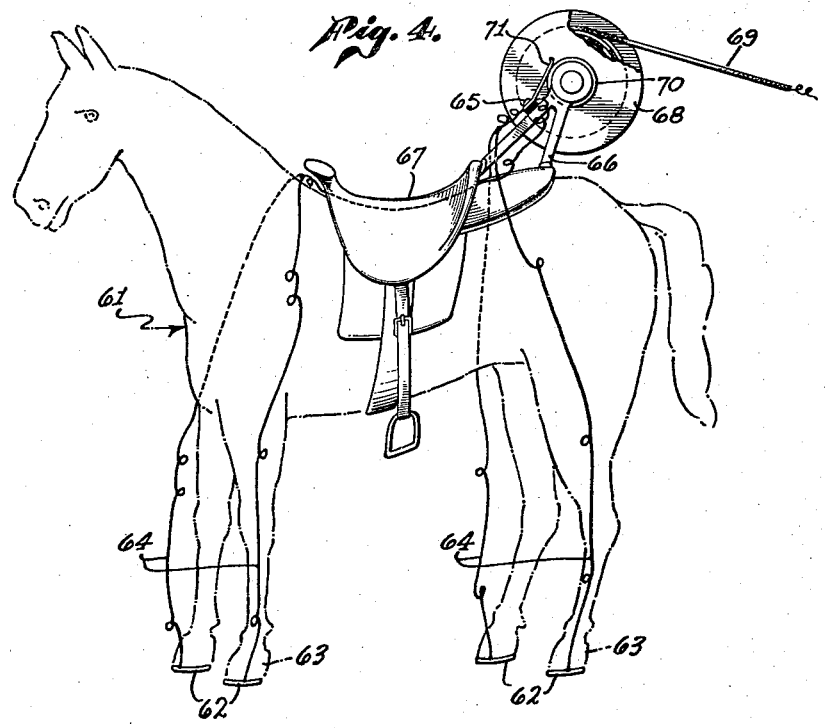
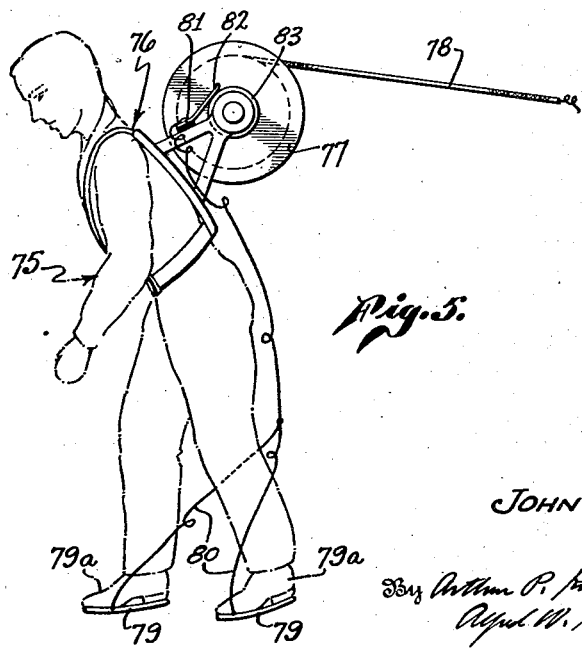

Patented Sept. 23, 1941

2,256,742

UNITED STATES PATENT OFFICE

2,256,742

ELECTRICAL EXPLORATION OF THE SUBSURFACE

John Jay Jakosky, Los Angeles, Calif.

Application June 13, 1939, Serial No. 278,806

1 Claim. (Cl. 175—182)

This invention relates to the electrical exploration of the subsurface and pertains more particularly to an electrode means for use in such exploration.

A general object of the invention is to provide for increasing the speed and efficiency of such surveys.

Another object of the invention is to provide electrode means which is movable to different positions along the earth's surface while maintaining substantially continuous electrical contact therewith.

A further object of the invention is to provide electrode means which may be used over various types of terrain and which is adapted to maintain substantially continuous electrical contact with the earth while in movement over such terrain.

Further objects and advantages of the invention will either be brought out in the following description or will be apparent therefrom.

The apparatus of this invention includes an electrode device which is adapted to be moved over the surface of the earth to successively establish electrical contact with each of a plurality of points which are spaced from one another along the earth's surface while being in contact with at least one of the points at all times. The electrode device comprises a plurality of separate contact members which are adapted for connection to the earth at the spaced points either by direct contact with the earth or through electrode means which are connected to the earth at these points. The electrode device is further provided with a terminal member which is common electrically to all of the contact members and a plurality of flexible conductive connecting members are provided for connecting the respective contact members to the common terminal member. The flexible connecting members are of sufficient length to provide for simultaneous connection of the terminal member to separate contact members disposed at at least two adjacent ones of the spaced points during movement of the electrode device over the surface of the earth. An electrical circuit having one terminal connected to the common terminal member is provided and further includes an electrical conductor which extends to a position removed from the electrode device. My invention also embraces a novel method of electrode movement in an electrical exploration process in which an electric circuit is maintained between two electrode means connected to the earth at positions spaced from one another along a line, as will be more particularly pointed out hereinafter.

The above and other features of my invention will be better understood when described in conjunction with the accompanying drawings, in which:

Fig. 4 is a side elevation of a modified form of electrode device; and

Fig. 5 illustrates another form of electrode device which is comparable to the one illustrated in Fig. 4.

Figure 1:
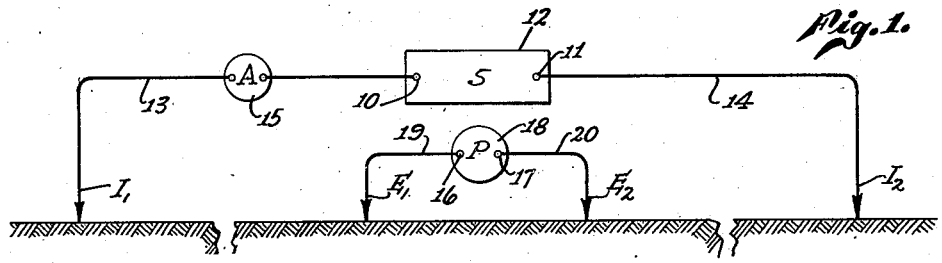
Fig. 1 is a vertical section through the earth illustrating diagrammatically a conventional electrode arrangement and apparatus which may be used for the electrical exploration of the subsurface.

In Fig. 1 a typical electrical survey apparatus is shown as comprising a pair of energizing electrodes $I_1$ and $I_2$ connected to the earth at spaced positions and to opposite terminals 10 and 11 of a source of electric current 12 through the agency of insulated conductors 13 and 14 respectively. In accordance with common practice, an ammeter 15 is connected in series in the energizing circuit to measure the current flowing through the earth between the electrodes $I_1$ and $I_2$. A pair of potential electrodes $E_1$ and $E_2$ are shown connected to the earth at spaced positions within the path of current flow between the electrodes $I_1$ and $I_2$ and to terminals 16 and 17 of a potential-responsive measuring means 18 through insulated conductors 19 and 20, respectively. In practice, one or both of the energizing electrodes $I_1$ and $I_2$ are moved to different positions along the earth's surface to vary the path of current flow between these electrodes, and measurements are taken involving the potential difference between the electrodes $E_1$ and $E_2$ for the different paths of current flow. The electrodes $E_1$ and $E_2$ may remain in the same position as the path of current flow is so varied, as disclosed and claimed in my copending application Serial No. 172,009, filed October 30, 1937 and issued on March 5, 1940 as Patent No. 2,192,404, or they may be moved to different positions. According to some survey procedures, the potential electrodes $E_1$ and $E_2$ are replaced by a device which is responsive to the magnetic or electromagnetic field produced by the flow of current through the earth between the energizing electrodes. In any of these procedures, however, it is customary to successively change the position of one or more electrodes so as to successively contact different points along the earth's surface. As brought out in my Patent No. 2,105,247, it is of extreme advantage to maintain substantially continuous contact with the earth as the electrode or electrode device is moved to different points along the earth's surface; this not only results in a great saving in time during the survey, but also results in greater accuracy during the survey. As with the electrode device of the above patent, the electrode means of this invention is not limited to any particular procedure, but may be employed with any of the methods of electrical exploration of the subsurface in which electrical connection is successively established at spaced points along the earth's surface.

Figure 2:
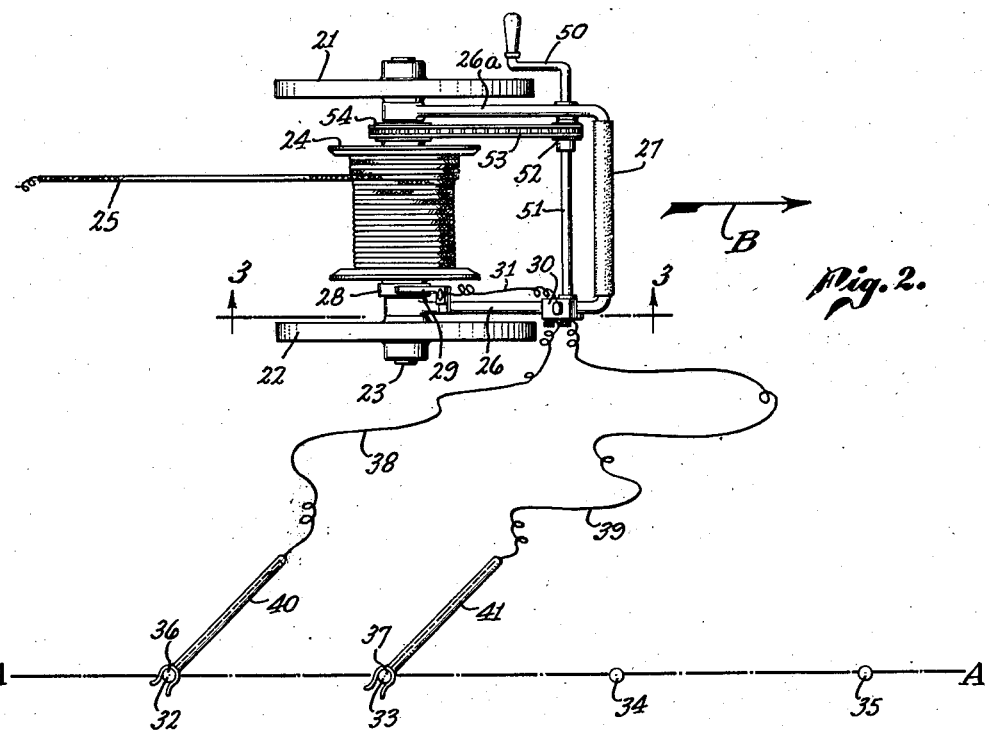
Fig. 2 is a plan view of an electrode device according to my invention illustrating the method of use thereof in the field.
Figure 3:
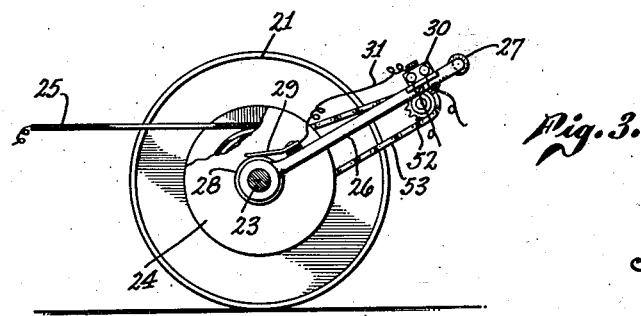
Fig. 3 is a partly broken away sectional elevation of the electrode device taken along line 3—3 of Fig. 2.

Referring to Figs. 2 and 3, the electrode means of this invention is shown as comprising a wheeled carriage which includes wheels 21 and 22 mounted on an axle 23 carrying a reel 24 for storing a conductor 25. The wheels shown may comprise conductive disc or spoked wheels. Draft bars 26 and 26a are shown connected to the axle 23 on opposite sides of the reel 24 and to a suitably insulated handle 27 which may be grasped manually to wheel the carriage over the surface of the earth. The end of the conductor 25 carried on the reel 24 may be brought out of the reel in a well known manner and connected to a slip ring 28 mounted concentric with the shaft 23 and rotated with the reel 24. The slip ring 28 may be electrically connected to the shaft 23 or insulated therefrom, as desired. Sliding contact means such as a spring brush 29 is shown in sliding engagement with the slip ring 28 and is mounted upon the draw bar 26. The brush 29 may be insulated from the draw bar 26 and from the rest of the wheeled carriage if desired. Terminal means comprising a terminal block 30 mounted for movement with the electrode device as upon the draw bar 26 and suitably insulated therefrom if desired, is shown connected through a conductor 31 to the brush 29.

Assuming that the electrode means is to be used in the place of the energizing electrode I₂ illustrated in Fig. 1 and that it is to be moved along the surface of the earth to successively establish electrical contact with each of a plurality of points such as defined by the stake electrodes 32, 33, 34, and 35 which are spaced from one another along the surface of the earth and lie along a traverse line such as defined by the line A—A for example, the conductor 25 may be connected to the terminal 11 of the power source 12 and the electrode device may be started in movement in the direction of the arrow B adjacent the line A—A. Separate contact members 36 and 37 are connected to adjacent ones of the electrodes 32 and 33 and through flexible conductive connecting members 38 and 39 to the common terminal member 30 and are thus placed in circuit with the conductor 25. Thus the contact members 36 and 37 are electrically connected together and to one terminal of the energizing circuit and constitute in effect a single electrode means. The conductor 25 is included in the electrical circuit which also includes the power source 12 which has one terminal connected to the terminal 30. The contact members 36 and 37 are shown formed as U-shaped spring clips such as the conventional clip found in a conventional cartridge fuse assembly so that they may easily be detachably connected to the stake electrodes such as 32 and 33, and are shown placed on the ends of insulating handles 40 and 41 respectively, which facilitate operation and also serve to protect the operator from shock.

It will be seen that the members 38 and 39 are of sufficient length to provide for the simultaneous connection of the terminal member to separate contact members 36 and 37 disposed at at least two adjacent ones of the spaced points defined by the electrodes 32 and 33 during movement of the electrode device over the surface of the earth. The flexible connecting members 38 and 39 are preferably of equal length so that as the electrode device continues its movement the connection 38 will become taut and cause disengagement of the contact member 36 from the electrode 32. At this time contact is still maintained between the connector 37 and the electrode 33. When the connector 36 is disengaged, an operator may grasp the handle 40 and move forward in the direction of the arrow B and establish connection between the contact member 36 and the next successive point as defined by the electrode 34. As the electrode device continues to move, the connection 39 becomes taut and the contact member 37 is pulled loose from the electrode 33. At this time an operator may grasp the handle 41 and move the contact member 37 forward in the direction of the arrow B to establish connection between this contact member and the next successive point as defined by the electrode 35 while connection to the earth is being maintained through the contact member 36 and the electrode 34. Electrical contact is thus maintained through electrode 34, which is located intermediate the electrodes 33 and 35, from the time contact is broken through the electrode 33 until contact is established through electrode 35 which is located forwardly of the electrode 34 in the direction of movement of the electrode means. This procedure may be continued for as far as it is desired to move the electrical connection along the surface of the earth.

After an electrode has been contacted by either one of the members 36 or 37, it may be removed from the ground and moved forward to a new point and again driven into the ground. The points occupied by the successive electrodes may be spaced from one another by any desired distance, and in practice this distance is usually short, on the order of from 25 to 100 feet, which distance is small when compared to the total separation between the energizing electrodes I₁ and I₂ or the distance between the potential electrodes E₁ and E₂. Thus, even though the terminal member 30 is connected to two or more of the successive points at the same time, it still may be considered as connected to a single electrode, since the interval occupied by the connected points is usually small when compared to the total interval between electrodes in the system as defined by I₁ and I₂. It will be appreciated that, if desired, more than two flexible conductive connecting members may be connected to the terminal 30 so that more than two successive electrodes may be connected to the circuit at the same time.

For convenience I prefer to carry the reel 24 on the electrode device so that the cable 25 unwinds therefrom as the electrode device is moved over the surface of the earth. As brought out in my Patent No. 2,105,247, this involves less labor than leaving the reel in a fixed position and unwinding the cable from the fixed reel as the electrode device is moved over the surface of the earth. In the latter case the cable is dragged over the earth's surface and is subjected to considerable wear.

In general it is necessary to correlate the measurements obtained with the position of the moving electrode on the earth's surface. For this purpose I may equip the reel 24 with a suitable contacting device such as shown in Figs. 1 and 7 of my Patent No. 2,105,247, so that as given increments of the cable 25 are unwound from the reel 24 a record may be obtained which may be used to show the position of the electrode device as described in said patent. As another example, each of the electrodes 32, 33, 34, and 35, etc., may be marked with their location so that as the operator makes successive contact with these various electrodes he may telephone the operator taking the measurements and so inform him as to the position of the electrode device. A suitable telephone arrangement for this purpose may be carried on the electrode device and may comprise a telephone system such as described and claimed in my copending application Serial No. 145,795, filed June 1, 1937 and issued on August 1, 1939, as Patent No. 2,167,950. Furthermore, if the power source 12 maintains a substantially constant potential as the contact members 36 and 37 are moved from electrode to electrode, there is a definite and well defined variation in current as indicated by the ammeter 15 between the times when both of the contact members are in contact with electrodes and when only one of the contact members is in contact with an electrode. Thus, by observing the fluctuations of the ammeter 15, the position of the electrode device may be followed as it moves along the traverse line.

After the electrode device has traversed the required distance, the cable 25 may be rewound on the drum 24 by turning operating crank 50 on shaft 51 carrying a sprocket 52 which is connected through a chain 53 to another sprocket 54 connected to the drum 24.

As stated previously, the wheels 21 and 22 may be insulated from the circuit to which the conductor 25 is connected and also insulated from the slip ring 28, brush 29, and terminal means 30 if desired. Or, if desired, the electric circuit may be electrically connected to the axle 23 and the wheels 21 and 22 may be provided in a well known manner with pneumatic tires which will serve to insulate the electrode device from the ground at this point. However, when the wheels 21 and 22 are connected to the electric circuit as to the slip ring 28, they also serve as moving contact members and improve the contact to the earth. This assumes of course that the wheels are conductive. In this connection, the electrode device illustrated in Figs. 2 and 3 may be drawn by a mobile electrode device such as the tractor illustrated in my Patent No. 2,105,247, and the electric circuit may be connected also to the tractor through the terminal means 30 to further improve the contact with the earth. This arrangement may be used where the earth's surface is covered with dry sand or the like and the stake electrodes 32, 33, etc., are thus used to augment the contact afforded by the mobile electrode shown in the patent.

Where relatively long lines are to be run in areas in which good contact may be afforded by the soil surface, I may use an arrangement such as illustrated in Fig. 4. With this arrangement, a quadruped, such as a horse 61, is provided with contact members 62 attached to its feet 63, and the contact members 62 are connected through suitably insulated flexible conductive connecting members 64 to a common terminal member 65. If desired, the plates 62 may be insulated from the horse's feet 63 in any well known manner. The terminal member 65 is shown carried by a suitable rack 66 carried on the horse's back, and in this case attached to a saddle 67. The rack 66 also serves to support a cable reel 68 carrying a supply of cable 69 extending to a point removed from the electrode device like the cable 25 of Figs. 1 and 2. The cable 69 has the end thereof carried by the reel 68 connected to a suitable slip ring 70 which is slidingly engaged by a spring brush 71 connected to the terminal means 65 and is thus placed in circuit with the contact members 62. When the horse is ridden or driven along the ground the contact members 62 contact successive points along the earth's surface and at least one of these contact members is connected to the earth at all times as the animal walks along the earth's surface. With this arrangement, the position of the moving contact device may be determined at all times according to manners previously described in connection with Figs. 2 and 3.

Where short lines are to be run in areas where the soil affords good surface contact, I may employ an arrangement such as illustrated in Fig. 5. In this figure a biped, such as a man 75, is shown provided with a suitable harness 76 upon which is mounted a cable reel 77 for storing a cable 78 extending to a position removed from the electrode device in the same way as the cable 25 of Figs. 2 and 3. The man 75 is further provided with contact plates 79 which are attached to his feet 79a and are connected through suitably insulated flexible conducting connecting members 80 to a common terminal 81 which is connected through a brush 82 to a slip ring 83 connected to the cable 78. If desired, the plates 79 may be insulated from the man's feet in any well known manner. The operation of this arrangement is generally the same as the arrangement illustrated in Fig. 4, and as long as the man walks or stands still he will at all times establish contact to the earth through one or both of the connection plates 79.

As previously pointed out, the electrode devices of this invention may be used in either potential or current circuits. Hence, the electrode devices illustrated and described herein may be used for example as any or all of the electrodes $I_1$, $I_2$, $E_1$, and $E_2$ illustrated in Fig. 1 when it is desired to move any of these electrodes to different positions along the earth's surface. It should be noted that in some cases it may be desirable to carry the energizing or measuring means such as illustrated in Fig. 1 over the earth's surface along with the terminal means illustrated in Figs. 2–5. If such is the case, the conductors 25, 69, and 78 shown in Figs. 2, 4, and 5 respectively will extend to another electrode or electrode device connected to the earth at a position removed from the electrode devices from which said cables extend.

When using the electrode devices of this invention in potential measuring circuits, no particular precautions are required to prevent shock to the operators or to the horse or man illustrated in Figs. 4 and 5. However, when using said devices in current or energizing circuits, higher voltages are usually encountered, and care must be taken to see that operators and the man, or the horse or other animal, are adequately insulated from the circuit so as to prevent shock.

My invention is obviously capable of considerable modification; hence I do not choose to be limited to the above descriptive examples thereof, but rather to the scope of the appended claim.

I claim:

In apparatus for the electrical exploration of the subsurface, the combination which comprises: more than two electrodes placed in the earth at points spaced from one another substantially along a line; an electrode device adapted to be moved over the surface of the earth to successively establish electrical contact with each of a plurality of such electrodes each located at one of such points spaced from one another along the earth's surface while being in contact with one of said electrodes at all times, comprising a plurality of separate contact members each provided with means for detachably connecting it to any one of said electrodes, a terminal member common to all of said contact members, and a plurality of flexible conducting connecting members connecting the respective contact members to the common terminal member, said flexible connecting members being of sufficient length to provide for simultaneous connection of two of said contact members to two adjacent ones of said spaced electrodes during movement of said electrode device over the surface of the earth; and an electrical conductor connected to said common terminal member and extending to a position removed from said electrode device for connection to one terminal of an electric circuit.

JOHN JAY JAKOSKY.